INVENTORS
LEO BELGARDE
DANIEL FAIRCHILD
MARTIN MAHDESYAN

BY Charles L. Willson

ATTORNEY

United States Patent Office 3,002,870
Patented Oct. 3, 1961

3,002,870
LIQUID FILTERS
Leo Belgarde, Pawtucket, Daniel Fairchild, Providence, and Martin Mahdesyan, Pawtucket, R.I., assignors to Fram Corporation, East Providence, R.I., a corporation of Rhode Island
Filed Sept. 27, 1960, Ser. No. 58,746
2 Claims. (Cl. 156—70)

This invention relates to liquid filters and more particularly, to a novel method of enclosing the filter element in an all nylon housing. This application is a continuation-in-part of our application, Serial No. 747,439, filed July 9, 1958, now abandoned.

The present filter in its preferred form comprises only three separate parts; namely, an annular filter element that is formed of pleated paper, and two molded nylon cups that together form a transparent housing for such element.

The two nylon cups are secured together at their matching rims by a spinning operation whereby the friction caused by rotating one cup relatively to the other under contacting pressure produces sufficient heat to soften the nylon at the area of contact, and bond one cup firmly to the other with the filter element held in place in the nylon housing.

Each nylon cup preferably has an integral nylon tube projecting centrally from an end thereof, so that when the two cups are united to form an all nylon shell, one tube provides an inlet passage and the other an outlet passage. The construction is such that an inexpensive and light weight liquid filter is produced that can be easily and quickly installed in a hose line by simply cutting the hose and sliding the cut ends over these projecting tubes.

In order to reduce the cost of assembling the present filter, one nylon cup is provided with a number of long slender nylon fingers projecting inwardly from the cup bottom. These fingers serve to hold the filter element in place in the nylon cups during the spinning operation, and throughout the life of the filter.

A primary feature of the present invention, therefore, resides in the method where the filter parts above briefly described are permanently assembled to form a liquid tight nylon housing having the filter element retained in its operating position in such housing by the pressure of the flexible nylon fingers. This makes it unnecessary to cement the filter element in place in one of the cups and makes it possible to assemble the filter parts at high speed and at low cost.

The present filter may be used to filter various liquids, but was designed primarily to filter the gasoline supplied to an internal combustion engine.

The above and other features of the present invention will be further understood from the following description when read in connection with the accompanying drawing, wherein.

Figure 1:
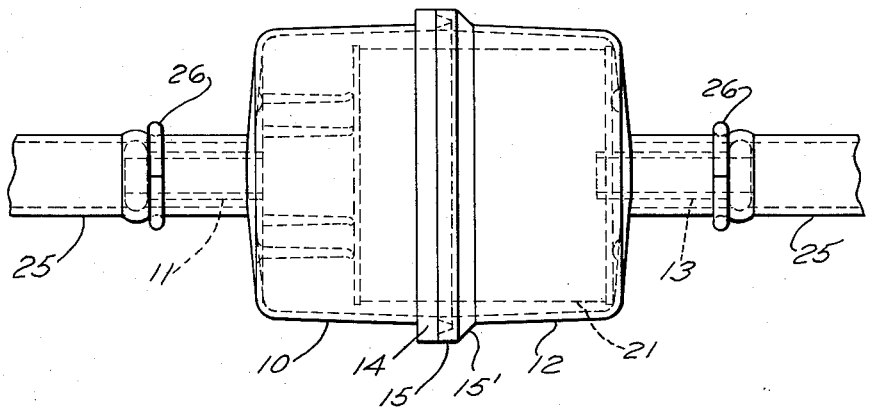
FIG. 1 is a side view of the liquid filter of the present invention connected in a hose line.

The filter element is enclosed in a transparent nylon housing formed of a cup 10 having a central tube 11, and a cup 12 having the central tube 13. Each tube has an enlarged annular bead at its outer end to fit snugly in the hose of the fuel line.

The cup 10 has a thick annular rim 14 and the cup 12 has a thick annular rim 15 with the inclined wall 15'. The rim 14 has the protruding annular rib 16 and the rim 15 has the annular groove 17 adapted to receive the rib 16. The cup 10 has projecting inwardly from the bottom thereof the molded long flexible fingers 18 that are spaced about the inner end of the tube 11. Each cup is molded as shown from a transparent nylon compound, and when bonded one to the other at their matching rims 14 and 15 they permanently house a filter element 21. The bottom of the cup 12 has the annular inner rib 19.

This filter element 21 is preferably formed of pleated paper having the pleats arranged in a circle to form a cylindrically shaped filter. One end of this filter element is closed by a metal or other cap 22 having a hard, smooth outer surface, and the other end is closed by a disc 23 preferably formed of thick paper and having a central hole that fits around the inner end of the tube 13. The inner end of this tube extends a short distance in the central passage 24 of the pleated filter element.

The entire device is simple and inexpensive to make and consists of only three elements; namely, the cup 10, the cup 12, and the filter element 21. The two cups are molded ready to be secured together of transparent nylon so that the filter element can be seen therein. Therefore, it is easy to see how much dirt has accumulated in the corrugated pleats.

Figure 2:
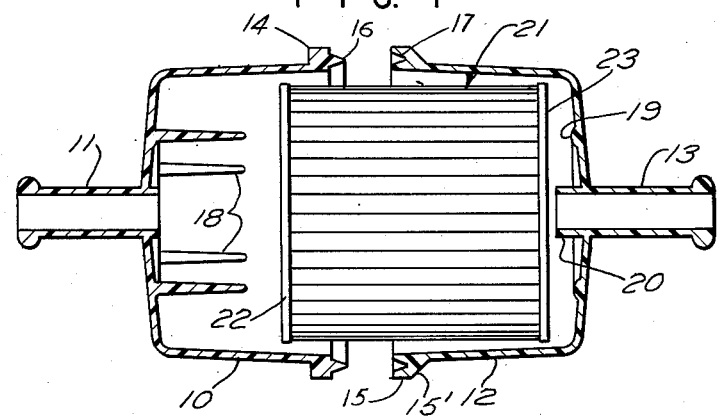
FIG. 2 shows the filter element within the two housings forming cups before these cups are secured together.

In assembling the device all that is necessary is to place the filter element 21 in the cups 10 and 12 as shown in FIG. 2. Then when these cups are forced together so that their rims 14 and 15 meet, the flexible nylon fingers 18 will engage the metal end cap 22 of the element 21 and forces the opposite end cap 23 into sealing engagement with the nylon ring 19.

Figure 3:
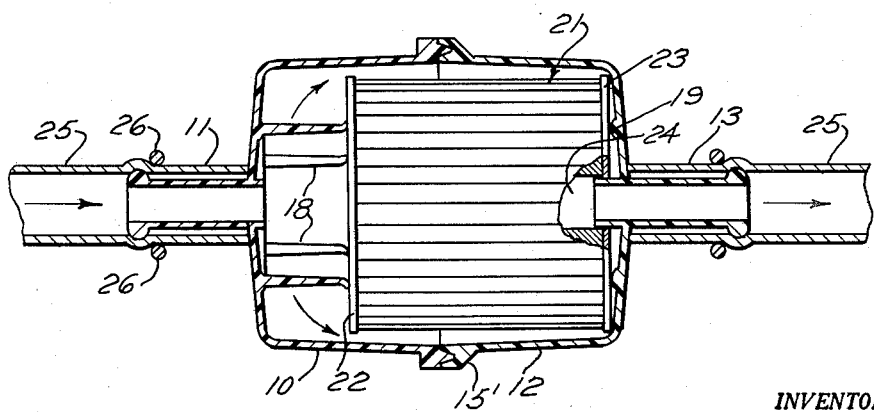
FIG. 3 is a longitudinal section of FIG. 1.

The two cups are permanently secured together by rotating one rapidly relatively to the other by holding one cup and rotating the other while their rims 14, 15 are forced together. The friction thus produced between the contacting portions of the rims 14 and 15 will produce sufficient heat to momentarily soften the nylon at the contacting surface, and thereby bond one firmly to the other. During this rotation the outer ends of the flexed fingers 18 will slide on the metal cap 22 while they retain the filter element 21 in its operating position of FIG. 3.

This filter having a nylon shell is an in-line type of filter that is easily installed in a hose line 25 by cutting the hose and forcing the cut hose ends over the projecting tubes 11 and 13 as shown. Then the hose ends may be secured in this position by the spring clamping rings 26.

Because of the simple construction of the several parts of the present filter and the easy method with which the parts are assembled, the filter can be manufactured at slight cost, and can be easily installed in a hose line, such as a fuel line leading to the carburetor of an engine. The flow of the fuel through the filter is preferably, but not necessarily, in the direction indicated by the arrows. The all nylon housing is tough and durable and will not rust or corrode.

Having thus described our invention, what we claim and desire to protect by Letters Patent is:

1. The method of making a liquid filter, comprising a filter element housed in a transparent shell having an inlet and outlet, wherein the shell is formed of two transparent molded nylon cups, one of which has flexible integral fingers projecting inwardly from its bottom and the meeting rim edges of the cups are bonded together, which comprises forming a filter element closed at one end by a cap having a hard, smooth outer surface and at the other end by a cap that has a central opening, placing the cups together with their edges meeting and with the filter element held in place in the shell by the engagement of the fingers with said smooth surface, and rotating one cup relatively to the other under pressure while the fingers slide on said surface, to frictionally heat the cup edges sufficiently to soften the nylon and bond the cup together.

2. The method of making a liquid filter, comprising a filter element housed in a transparent shell formed of two transparent molded nylon cups, one of which has flexible integral fingers projecting inwardly from its bottom, and having said filter element permanently housed in the shell with the meeting edges of the cups bonded together, which comprises forming a pleated filter element closed at one end by a cap having a hard, smooth outer surface and at the other end by a cap that has a central opening, placing the cups together with their edges meeting and with the filter element held in place in the shell by the engagement of said fingers with said smooth surface, and rotating one cup relatively to the other under pressure while the fingers slide on said smooth surface, to frictionally heat the cup edges sufficiently to soften the nylon and bond the cups together.

References Cited in the file of this patent

UNITED STATES PATENTS

| 2,933,428 | Mueller | Apr. 19, 1960 |
| 2,956,611 | Jendrisak | Oct. 18, 1960 |

OTHER REFERENCES

Plastics for December 1945, article by Freres, pages 64, 66, 67, 113, 114, 115.